(12) United States Patent
Regan (10) Patent No.: US 11,810,679 B2
(45) Date of Patent: *Nov. 7, 2023

(54) MITIGATING PLASMA INSTABILITY

(71) Applicant: X Development LLC, Mountain View, CA (US)

(72) Inventor: William Raymond Regan, San Carlos, CA (US)

(73) Assignee: X Development LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/992,344

(22) Filed: Nov. 22, 2022

(65) Prior Publication Data
US 2023/0077705 A1 Mar. 16, 2023

Related U.S. Application Data

(63) Continuation of application No. 17/096,172, filed on Nov. 12, 2020, now Pat. No. 11,515,050.
(Continued)

(51) Int. Cl.
*G21B 1/11* (2006.01)
*G21B 1/05* (2006.01)
(Continued)

(52) U.S. Cl.
CPC ............ *G21B 1/11* (2013.01); *G21B 1/05* (2013.01); *H05H 1/00* (2013.01); *H05H 1/2406* (2013.01);
(Continued)

(58) Field of Classification Search
None
See application file for complete search history.

(56) References Cited

U.S. PATENT DOCUMENTS 4,543,231 A * 9/1985 Ohkawa .................. H05H 1/12
376/121
4,663,567 A * 5/1987 Wong .................... H05G 2/003
315/111.41

(Continued)

FOREIGN PATENT DOCUMENTS

GB 2496012 5/2013
GB 2496012 A * 5/2013 .............. B64G 1/40
(Continued)

OTHER PUBLICATIONS

Energy.sandia.gov [online], "Sandia Magnetized Fusion Technique Produces Significant Results," Feb. 24, 2015, retrieved on Feb. 1, 2021, retrieved from URL<https://energy.sandia.gov/sandia-magnetized-fusion-technique-produces-significant-results//>, 2 pages.
(Continued)

*Primary Examiner* — Srinivas Sathiraju
(74) *Attorney, Agent, or Firm* — Fish & Richardson P.C.

(57) ABSTRACT

A system for reducing plasma instability is disclosed. The system includes: an outer electrode having a first end and a second end spaced from the first end; and an inner electrode disposed inside of a void defined within the outer electrode and arranged coaxial with the outer electrode. The inner electrode includes: a base end defined by the first end of the outer electrode; and an apical end spaced from the base end. The system includes a fiber injector configured to inject a frozen fiber into the void from the apical end of the inner electrode; an electrode power source configured to energize the outer electrode and the inner electrode, and thereby, cause a plasma contained within the outer electrode to flow axially along the frozen fiber; and a frozen fiber power source configured to drive an electrical pulse to the frozen fiber.

20 Claims, 4 Drawing Sheets

Related U.S. Application Data (60) Provisional application No. 62/939,384, filed on Nov. 22, 2019.

(51) Int. Cl.
H05H 1/00 (2006.01)
H05H 1/24 (2006.01)
H05H 1/02 (2006.01)
H05H 1/46 (2006.01)

(52) U.S. Cl.
CPC ............. *H05H 1/0087* (2013.01); *H05H 1/02* (2013.01); *H05H 1/461* (2021.05)

(56) References Cited

U.S. PATENT DOCUMENTS

| | | | | |
|---|---|---|---|---|
| 4,759,894 A * | 7/1988 | McCorkle | ................ | H05H 1/04 376/144 |
| 11,087,891 B2 * | 8/2021 | Parks | ..................... | G21B 1/057 |
| 11,195,627 B2 * | 12/2021 | Dunaevsky | .............. | G21B 1/19 |
| 11,211,172 B2 * | 12/2021 | Van Drie | ................. | H05H 1/16 |
| 11,219,117 B2 * | 1/2022 | Shumlak | ................... | H05H 1/54 |
| 11,515,050 B1 * | 11/2022 | Regan | ..................... | H05H 1/24 |
| 2006/0198485 A1 * | 9/2006 | Binderbauer | .......... | G21B 1/052 376/121 |
| 2006/0254520 A1 * | 11/2006 | Rostoker | ................ | G21B 1/052 118/723 I |
| 2006/0267504 A1 * | 11/2006 | VanDrie | ................... | G21D 7/00 315/111.41 |
| 2010/0063344 A1 * | 3/2010 | Kotschenreuther | ...... | G21B 1/01 588/311 |
| 2010/0329407 A1 * | 12/2010 | Kotschenreuther | .... | G21B 1/057 976/DIG. 3 |
| 2016/0314856 A1 * | 10/2016 | Pinnow | ................... | G21B 3/002 |
| 2017/0011811 A1 * | 1/2017 | Slough | .................... | H05H 1/14 |
| 2018/0175023 A1 * | 6/2018 | Visokay | .............. | H01L 23/522 |
| 2019/0166679 A1 * | 5/2019 | Vinokhodov | .......... | H05G 2/006 |
| 2019/0198182 A1 * | 6/2019 | Parks | ..................... | G21B 1/057 |
| 2020/0168350 A1 * | 5/2020 | Shumlak | .................. | H05H 1/16 |
| 2023/0077705 A1 * | 3/2023 | Regan | ...................... | G21B 1/05 |

FOREIGN PATENT DOCUMENTS

| | | | | |
|---|---|---|---|---|
| GB | 2496013 | | 5/2013 | |
| GB | 2496013 A | * | 5/2013 | ........... F03H 1/0006 |
| GB | 2496022 | | 5/2013 | |
| GB | 2496022 A | * | 5/2013 | ......... G02B 27/0983 |
| GB | 2496250 | | 5/2013 | |
| GB | 2496250 A | * | 5/2013 | ............. G02B 17/00 |
| WO | WO 2005001845 | | 1/2005 | |
| WO | WO-2005001845 A2 | * | 1/2005 | ............... G21B 1/23 |

OTHER PUBLICATIONS

Gomez et al., "Experimental Demonstration of Fusion-Relevant Conditions in Magnetized Liner Inertial Fusion," Phys. Rev. Lett., Oct. 2014, 113:8 pages.
Lorenz et al., "Influence of a Prepulse Current on a Fiber Z Pinch," Phys. Rev. Lett., Jul. 1998, 81(2):361-364.
Rahman et al., "Fusion in a Staged Z-pinch," Astrophysics and Space Science, Mar. 2009, 323:51-55.
Sethian et al., "Enhanced stability and neutron production in a dense Z-pinch plasma formed from a frozen deuterium fiber," Phys. Rev. Lett., Aug. 1987, 59(8):892-900.
Shipley et al., "Implosion of Auto-Magnetizing Helical Liners On The Z Facility," Physics of Plasmas, 2019, 26(5):052705.
Slutz et al., "Auto-magnetizing liners for Magnetized Inertial Fusion: Helically-wound composite liners," Physics of Plasmas, 2017, 24(1):012704.
wikipedia.org/wiki/Z-pinch [online], "Z-Pinch," last edited Jan. 23, 2021, retrieved on Feb. 1, 2021, retrieved from URL<https://en.wikipedia.org/wiki/Z-pinch/>, 4 pages.
www.aa.washington.edu [online], "Flow Z-Pinch Experiments," 2021, retrieved on Feb. 1, 2021, retrieved from URL<https://www.aa.washington.edu/research/ZaP/>, 2pages.
www.aa.washington.edu [online], "Z-Pinch Formation on the ZaP Experiment," 2021, retrieved on Feb. 1, 2021, retrieved from URL<https://www.aa.washington.edu/research/ZaP/research/zPinchFormation/>, 2 pages.
Zhang et al., "Sustained neutron production from a sheared-flow stabilized Z-pinch," CoRR, Jun. 2018, arxiv.org/abs/1806.05894, 5 pages.

\* cited by examiner

MITIGATING PLASMA INSTABILITY

CROSS-REFERENCE TO RELATED APPLICATION

This application is a continuation of U.S. patent application Ser. No. 17/096,172, filed Nov. 12, 2020, which claims the benefit of U.S. Application No. 62/939,384, filed Nov. 22, 2019, which are incorporated by reference.

BACKGROUND

Plasmas composed of certain low atomic number elements can be heated and confined to release energy via nuclear fusion reactions. However, confinement of such plasma at high temperatures and densities is often limited by instabilities. Electric and magnetic fields, or inertia, can be used to confine plasma in numerous configurations, one family of which is known as Z-pinches. Magnetohydrodynamic plasma instabilities typically disrupt Z-pinch plasmas in present systems before currents and other parameters can be increased sufficiently and sustained to attain the conditions needed to achieve a net positive energy output, where fusion energy output exceeds the energy input required to heat and confine the plasma.

SUMMARY

This specification relates to reducing magnetohydrodynamic plasma instabilities. More specifically, the specification relates to mitigating instability in high temperature and high density plasma Z-pinches.

A plasma composed of certain elements can be induced to release nuclear energy. For example, a plasma can release nuclear energy through fusion, by merging light atoms into heavier atoms and rearranging nuclear bonds to move to a lower overall nuclear potential energy state with a higher average binding energy per nucleon. Nuclear fusion requires heating the fuel (low atomic number atoms to be fused) to high temperatures to allow a high rate of tunneling through the Coulomb barrier.

To achieve appreciable fusion reaction rates, the fuel needs to reach a density high enough to allow for frequent collisions and a temperature high enough to overcome the Coulomb barrier. The fuel needs to remain at a certain density and temperature for a time duration long enough to provide ample opportunities for fusion. To achieve and sustain these conditions, the fuel must be well confined. For example, the fuel can be confined using various combinations of electric fields, magnetic fields, and inertia.

A Z-pinch configuration is one method used to heat and confine fusion fuel. In a Z-pinch, an axial electrical current is induced in a column of fuel, heating the fuel from its initial state into a plasma and generating a magnetic field that exerts inward pressure on the plasma. In certain Z-pinches known as equilibrium Z-pinches, the electrical current can be increased in a way such that the magnetic pressure approximately balances the thermal pressure, which increases as the plasma heats. Z-pinches can suffer from fast-growing magnetohydrodynamic instabilities that prevent attainment of temperature and density conditions needed for net fusion energy output.

The present disclosure provides techniques for Z-pinch stabilization. The systems and processes described herein may improve Z-pinch stability. For example, systems and processes described herein may improve the stability of plasmas within a Z-pinch sufficiently long to attain higher energy gain over present systems. Improved Z-pinch plasma confinement can be applicable in fields such as fusion power reactors, fusion propulsion, medical isotope generation, neutron sources, intense light sources, and other fields that might benefit from improvements in plasma stability.

In general, innovative aspects of the subject matter described in this specification can be embodied in a system for reducing plasma instability. The system includes: an outer electrode having a first end and a second end spaced from the first end; an inner electrode disposed inside of a void defined within the outer electrode and arranged coaxial with the outer electrode. The inner electrode includes a base end defined by the first end of the outer electrode; and an apical end spaced from the base end. The system includes a fiber injector configured to inject a frozen fiber into the void from the apical end of the inner electrode; and an electrode power source configured to energize the outer electrode and the inner electrode, and thereby, cause a plasma contained within the outer electrode to flow axially along the frozen fiber. The system includes a frozen fiber power source configured to drive an electrical pulse to the frozen fiber.

In some implementations, the system further includes magnetic coils configured to generate an axial magnetic field.

In some implementations, the frozen fiber includes one or more of deuterium and tritium.

In some implementations, the plasma includes one or more of deuterium, tritium, and helium-3.

In some implementations, the system further includes an end electrode positioned in the void and adjacent to the second end of the outer electrode.

In some implementations, the plasma flows axially along the frozen fiber in a sheared flow.

In some implementations, the electrode power source is configured to energize the outer electrode and the inner electrode when the frozen fiber reaches the second end of the outer electrode.

In some implementations, the frozen fiber power source is configured to drive the electrical pulse to the frozen fiber when the plasma surrounds the frozen fiber.

In some implementations, the frozen fiber power source is configured to drive the electrical pulse at a power level that causes sublimation of the frozen fiber.

In some implementations, the frozen fiber power source is configured to drive the electrical pulse at a power level that causes sublimation and ionization of the frozen fiber into the void to form a plasma annulus around the frozen fiber.

In some implementations, the frozen fiber power source is configured to drive the electrical pulse to the apical end of the inner electrode.

In another general aspect, a system for reducing plasma instability includes: a top electrode; a bottom electrode; and magnetic coils arranged in relation to the top electrode and the bottom electrode. When energized, the magnetic coils generate an axial magnetic field between the top electrode and the bottom electrode. The system includes a fiber injector configured to inject a frozen fiber from the top electrode toward the bottom electrode; a first power source configured to preheat the frozen fiber, and thereby, cause sublimation and expansion of the frozen fiber material to form an annular liner; and a second power source configured to drive an electrical pulse to the frozen fiber.

In some implementations, the frozen fiber includes one or more of deuterium and tritium.

In some implementations, the first power source is one or more of a microwave energy source or a laser energy source.

In some implementations, the second power source is configured to drive the electrical pulse at a power level: that causes sublimation and ionization of the frozen fiber material to form a plasma annulus around the frozen fiber, and that causes a magnetized liner implosion of the annular liner onto the frozen fiber and the plasma annulus.

In some implementations, the frozen fiber power source is configured to drive the electrical pulse to the apical end of the inner electrode when the plasma surrounds the frozen fiber, thus initiating a magnetized liner implosion of the plasma onto the frozen fiber and a plasma annulus surrounding the frozen fiber.

In some implementations, the magnetized liner implosion amplifies the axial magnetic field in a region between the plasma and the plasma annulus.

In another general aspect, a method for reducing plasma instability includes injecting a frozen fiber made of dense fiber material from an apical end of an inner electrode. The inner electrode is disposed inside of a void defined within an outer electrode and is arranged coaxial with the outer electrode. The method includes energizing the outer electrode and the inner electrode, and thereby, cause a plasma contained within the outer electrode to flow axially along the frozen fiber. The method includes driving an electrical pulse to the flowing-plasma-covered frozen fiber, heating and confining the plasma while mitigating instability through shear and by the presence of the dense fiber material.

In some implementations, the method includes energizing the outer electrode and the inner electrode when the frozen fiber reaches an end of the outer electrode.

In some implementations, the frozen fiber is made of one or more of deuterium and tritium.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
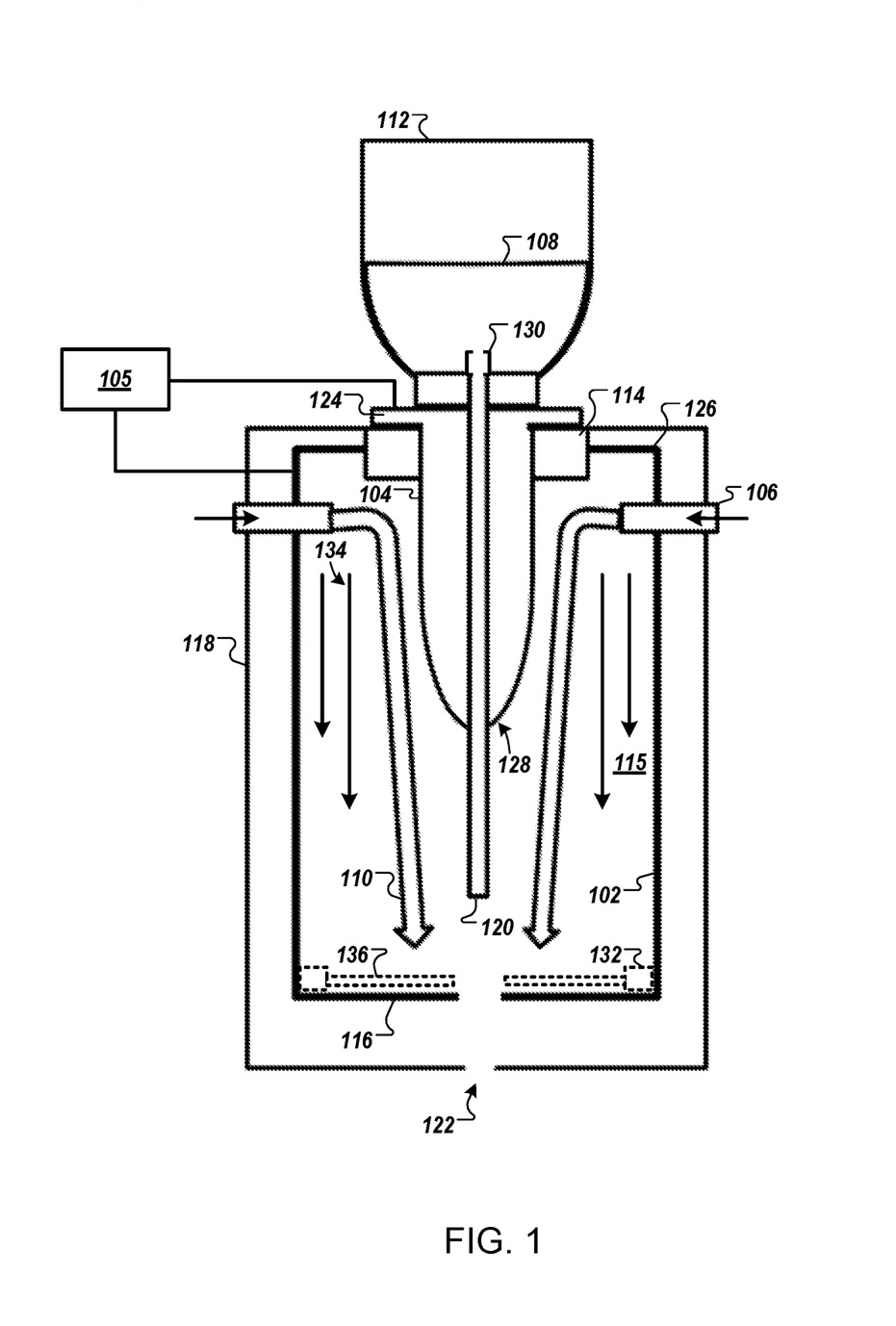
FIG. 1 depicts a diagram of an example system for reducing plasma instability with a sheared plasma flow applied across a frozen fiber.

FIG. 1 depicts a diagram of an example system 100 for reducing plasma instability with a sheared plasma flow applied across a frozen fiber.

The stabilization system 100 includes an outer electrode 102, an inner electrode 104, and insulators 114 between the inner electrode 104 and the outer electrode 102. The outer electrode 102 can include a first end 126, and a second end that is spaced from the first end. For example, the first end 126 can be adjacent to the insulators 114, and the second end can include an end wall 116. The inner electrode 104 can be coaxial with the outer electrode 102. The inner electrode 104 can include a base end 124 and an apical end 128 that is spaced from the base end 124.

The stabilization system 100 includes a power supply 105. The power supply 105 can provide multiple electrical pulses (e.g. applied voltages that cause electrical currents) to various components of the stabilization system 100. For example, the power supply 105 can cause a voltage difference between the inner electrode 104 and the outer electrode 102, which will then cause ionization of neutral gas and electrical currents which accelerate the resulting plasma, which flows axially within a void 115 within the outer electrode 102 (e.g. along the direction of arrow 134). In another example, the power supply 105 can induce a voltage axially along a frozen fiber 120 extending from the apical end 128 of the inner electrode 104. The voltage can cause frozen fiber material to sublimate, ionize, and expand into the void 115, creating an annular plasma surrounding the fiber. In some examples, the power supply 105 can include a pulsed power bank that can provide a driving current to one or more electrodes.

The system 100 includes one or more gas injectors 106 and a vacuum chamber wall 118 with an exhaust port 122. In some implementations, the stabilization system 100 can optionally include an end electrode 136 and optional insulators 132 between the outer electrode 102 and the end electrode 136. In such implementations, the end electrode 136 would serve as the end wall 116. In other words, the end electrode 136 replaces the end wall 116 of the outer electrode 102.

The stabilization system 100 includes a dewar 112 that can contain a fiber material 108. The dewar 112 can be an insulated storage vessel that can maintain a temperature of the fiber material 108. The fiber material 108 can include deuterium, tritium, or a mix of deuterium and tritium, where the material is held at a temperature near the liquid-solid transition. The dewar 112 can include a fiber injector 130.

In operation, the fiber injector 130 of the dewar 112 can inject the fiber material 108 through the inner electrode 104. The fiber material 108 forms a frozen fiber 120 that extends from the apical end 128 of the inner electrode 104 into the void 115. When the fiber 120 is near or touching the end wall 116 of the outer electrode 102, the injectors 106 can inject a neutral gas into the void 115 through the vacuum chamber wall 118. The neutral gas can include, for example, any combination of deuterium, tritium, and helium-3 gas.

An electrode power supply, e.g., power supply 105, can apply a voltage between the inner electrode 104 and the outer electrode 102. A voltage difference between the inner electrode 104 and the outer electrode 102 ionizes the neutral gas, creating a plasma. The resulting currents cause a magnetic field that induces a plasma flow 110 toward the exhaust port 122. The plasma contained within the outer electrode 102 flows axially along the fiber 120, e.g., in the direction of arrow 134. The plasma flow 110 may be sheared plasma flow, e.g., with plasma nearer to the inner electrode 104 or fiber 120 flowing at a different velocity than plasma nearer to the outer electrode 102.

While the sheared plasma flow 110 flows over the fiber 120, a frozen fiber power source, e.g., the power supply 105, delivers an electrical pulse to the fiber 120. The electrical pulse induces a voltage difference across the fiber 120. This voltage causes sublimation and ionization of the surface of the fiber, resulting in an annular plasma at the fiber 120 surface which can support a large electrical current.

The continued presence of dense fiber material 108 from the fiber 120 can improve stability of the plasma annulus. As any local constrictions in the plasma annulus occur, additional fiber material 108 from the fiber 120 ionizes and fills in the constrictions with additional plasma. The sheared plasma flow 110 forms a flowing column surrounding the fiber 120 and its plasma annulus.

In tandem with the aforementioned stabilization mechanism provided by the fiber material 108 inside the plasma annulus, the sheared plasma flow 110 can offer an additional method to reduce plasma annulus instabilities on the exterior of the plasma annulus, by smearing out any local seeds of instabilities before the seeds of instabilities can grow significantly.

In some examples, the stabilization system 100 can include an end electrode 136 and optional insulators 132. The end electrode 136 can be connected to a pulsed power bank. The pulsed power bank can be a part of the power supply 105 or can be a separate power bank. The pulsed power bank can apply a large voltage between the end electrode 136 and apical end 128 of the inner electrode 104, driving current through both the sheared plasma flow 110 and plasma annulus surrounding the fiber 120.

The plasma can exit the vacuum chamber wall 118 through the exhaust port 122. The operation can repeat, with the injectors 106 injecting additional neutral gas, and the dewar 112 injecting additional fiber material 108 to form another fiber 120, before initiating the next discharge cycle.

Figure 2:
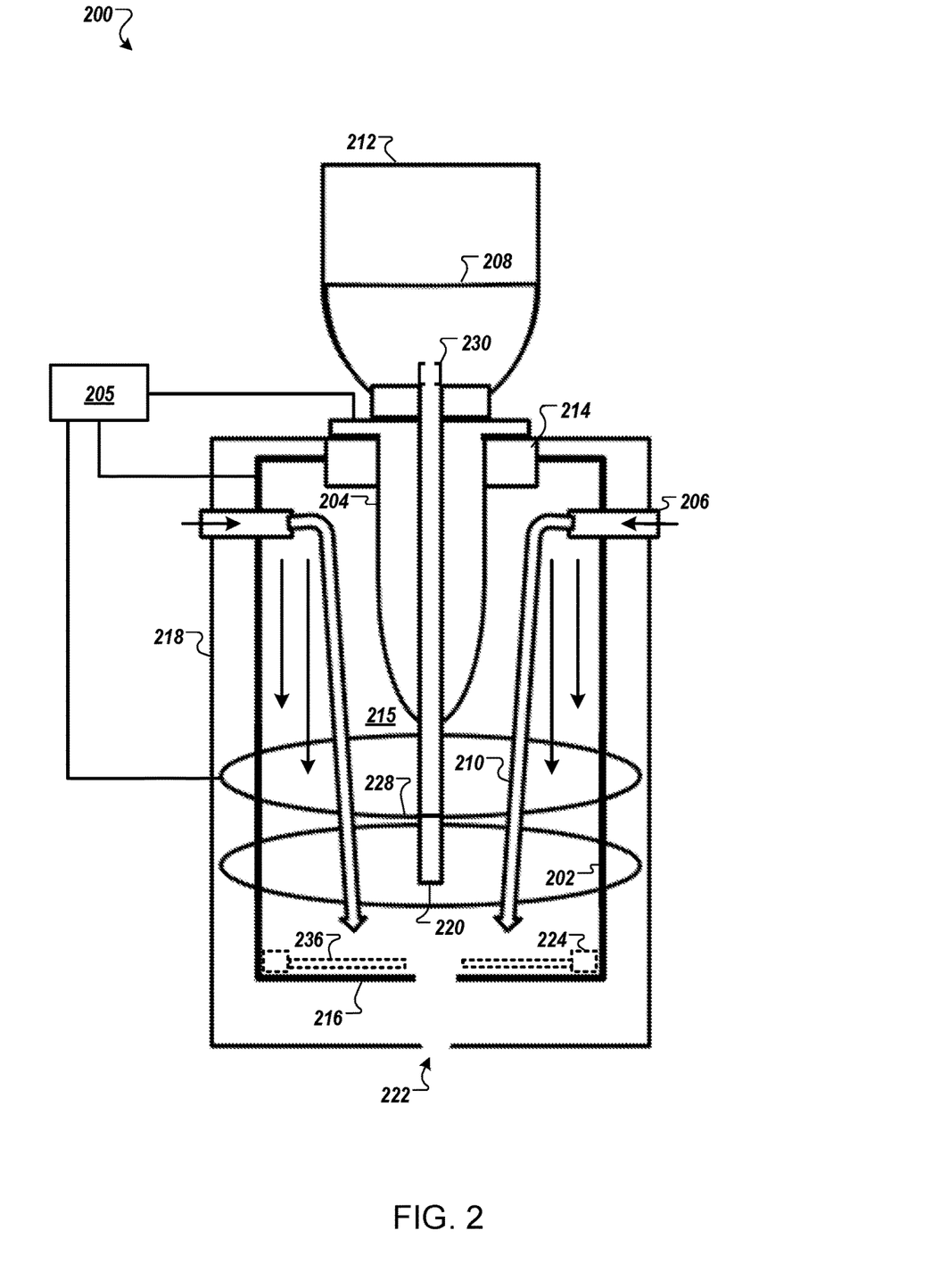
FIG. 2 depicts a diagram of an example system for reducing plasma instability with a sheared plasma flow serving as a liner for a magnetized liner implosion onto a plasma originating from a frozen fiber.

FIG. 2 depicts a diagram of an example system 200 for reducing plasma instability with a sheared plasma flow serving as a liner for a magnetized liner implosion onto a plasma originating from a frozen fiber. The overall structure and arrangement of components of stabilization system 200 are similar to the structure and arrangements of stabilization system 100. The stabilization system 200 includes an outer electrode 202 with an end wall 216, an inner electrode 204, and insulators 214. The stabilization system 200 also includes a void 215 within the outer electrode 202. The stabilization system 200 includes one or more gas injectors 206 and a vacuum chamber wall 218 with an exhaust port 222. The stabilization system 200 can optionally include an end electrode 236 and optional insulators 224.

The stabilization system 200 includes magnetic coils 228. In some examples, the magnetic coils 228 can be positioned inside or outside of the outer electrode 202. In some examples, the outer electrode 202 can be helically structured, such that the magnetic coils 228 are incorporated into the structure of the outer electrode 202.

The stabilization system 200 includes a dewar 212 that can contain a fiber material 208. The fiber material 208 can include deuterium, tritium, or a mix of deuterium and tritium, where the material is held at a temperature near the liquid-solid transition. The dewar 212 can include a fiber injector 230.

In operation, a power supply, e.g., power supply 205, can drive a current pulse through the magnetic coils 228. The power supply 205 can energize the magnetic coils 228 to generate an axial magnetic field around the frozen fiber 220. The current pulse can generate an axial magnetic field inside the outer electrode 202.

The fiber injector 230 can inject the fiber material 208 through the inner electrode 204. The fiber material 208 forms a frozen fiber 220 that extends from the inner electrode 204 into the void 215. When the fiber 220 is near or touching the end wall 216 of the outer electrode 202, the injectors 206 can inject a neutral gas into the void 215 through the vacuum chamber wall 218. The neutral gas can include, for example, any combination of deuterium, tritium, and helium-3 gas.

The power supply 205 can energize the inner electrode 204 and the outer electrode 202. A voltage difference between the inner electrode 204 and the outer electrode 202 ionizes the neutral gas, creating a plasma. The resulting currents create a magnetic field that induces a plasma flow 210 toward the exhaust port 222. The plasma flow 210 can be a sheared plasma flow, e.g., with plasma nearer to the inner electrode 204 flowing at a different velocity than plasma nearer to the outer electrode 202.

The sheared plasma flow 210 flows around the fiber 220 and experiences the axial magnetic field generated by the magnetic coils 228. While or just before the sheared plasma flow 210 flows over the fiber 220, the fiber 220 can be preheated, e.g., with a preliminary current ("pre-pulse") from the power supply 205. The power supply 205 can then set up a voltage axially across the fiber 220. The voltage causes a primary electrical current, or pinch discharge, to pass along a plasma annulus surrounding the fiber 220.

The pinch discharge causes fiber material 208 from a surface of the fiber 220 to evaporate, sublimate, and ionize, creating a plasma annulus around the fiber 220. The continued presence of dense material from the fiber 220 can improve stability of the plasma annulus. As any local constrictions in the plasma annulus occur, additional fiber material 208 from the fiber 220 can ionize and fill in the constrictions with additional plasma.

The sheared plasma flow 210 forms a flowing column surrounding the sublimating fiber 220 and can act as an imploding magnetized liner onto the fiber 220 and the surrounding plasma annulus resulting from a current pre-pulse. The power supply 205 can apply a voltage axially across the fiber 220. The voltage causes a large electrical current, shared between the magnetized plasma liner (which implodes inward) and the plasma annulus surrounding the fiber 220. The imploding magnetized plasma liner amplifies the magnetic field and adiabatically heats the plasma annulus surrounding the fiber 220. Instabilities of the plasma annulus can be tamped by the imploding magnetized plasma liner, and instabilities on the magnetized plasma liner itself can be mitigated by shear.

In some examples, the stabilization system 200 can include an end electrode 236 and optional insulators 224 between the end electrode 236 and the outer electrode 202. The end electrode 236 can be connected to a pulsed power bank. The pulsed power bank can set up a separate voltage (and resulting current profile) between the inner electrode 204 and outer electrode 202, across the fiber 220, and across leads of the magnetic coils 228. The pulsed power bank can be a part of the power supply 205 or can be a separate pulsed power bank.

The plasma can exit the void 215 through the exhaust port 222. The operation can repeat, with the magnetic coils 228 creating a new axial magnetic field, the injectors 206 injecting additional neutral gas, the dewar 212 injecting additional fiber material 208 to form another fiber 220, and a discharge causing another magnetized liner implosion onto a plasma annulus surrounding the fiber 220.

Figure 3:
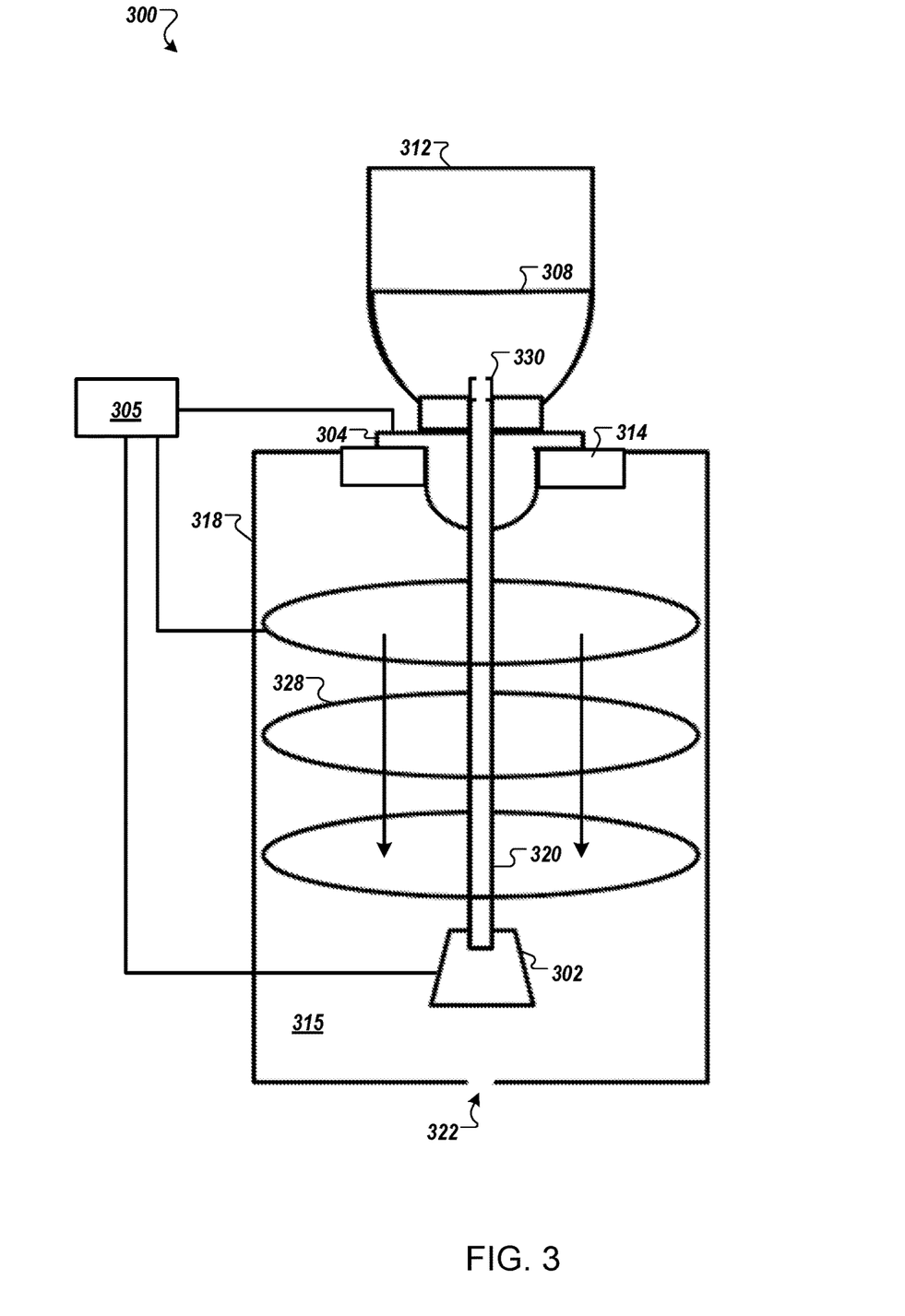
FIG. 3 depicts a diagram of an example system for reducing plasma instability with a magnetized liner implosion onto a frozen fiber, where the imploding liner is initially generated from the frozen fiber.

FIG. 3 depicts a diagram of an example system 300 for reducing plasma instability with a magnetized liner implosion onto a frozen fiber, where the imploding liner is initially generated from the frozen fiber. The stabilization system 300 includes a bottom electrode 302, a top electrode 304, and an insulator 314. The stabilization system 300 also includes a void 315 within a chamber wall 318 with an exhaust port 322. The stabilization system 300 also includes magnetic coils 328.

The stabilization system 300 includes a dewar 312 that can contain a fiber material 308. The fiber material 308 can include deuterium, tritium, or a mix of deuterium and tritium, where the material is held at a temperature near the liquid-solid transition. The dewar 312 can include a fiber injector 330.

In operation, a power supply, e.g., power supply 305, can drive a current pulse through the magnetic coils 328. The power supply 305 can energize the magnetic coils 328 to generate an axial magnetic field around a frozen fiber 320. The current pulse can generate an axial magnetic field inside the chamber wall 318.

The fiber injector 330 can inject the fiber material 308 through the top electrode 304. The power supply 305 can drive a current pulse through the magnetic coils 328 to seed an axial magnetic field. The fiber material 308 forms a frozen fiber 320 that extends from the top electrode 304 into the void 315, toward the bottom electrode. When the fiber 320 is near or touching the bottom electrode 302, a series of preheating and primary discharges can occur to create a magnetized liner implosion.

The fiber 320 may be preheated to create an expanding plasma liner composed of the fiber material 308. To cause this preheating, the power supply 305 applies a voltage between the top electrode 304 and the bottom electrode 302, resulting in sublimation and ionization of the surface of the fiber 320 and an expanding annulus of fiber material 308. In some examples, in addition to or instead of the electrical pre-pulse, the fiber 320 can be preheated with an external heating mechanism such as microwave or laser energy heating the surface of the fiber 320.

The primary discharge can proceed, where the power supply 305 can apply a voltage between the top electrode 304 and the bottom electrode 302, inducing an electrical current which may be shared between the plasma liner and a new plasma annulus surrounding the fiber 320. This electrical pulse causes heating and confinement of the plasma annulus surrounding the fiber 320, as well as heating and implosion of the plasma liner onto the inner plasma annulus and fiber 320. The imploding plasma liner can also amplify both the axial and azimuthal magnetic fields and adiabatically heat the plasma annulus surrounding the fiber 320. Instabilities of the inner plasma annulus may be partially mitigated by the imploding plasma liner, and partially mitigated by the presence of the remaining non-ionized dense fiber material 308 from the fiber 320.

The plasma can exit the void 315 through the exhaust port 322. The operation can repeat, with the dewar 312 injecting additional fiber material 308 to form another fiber 320, the magnetic coils 328 creating a new axial magnetic field, a preheating step creating a plasma liner to be emitted from the fiber 320, and a primary discharge causing a magnetized liner implosion.

Figure 4:
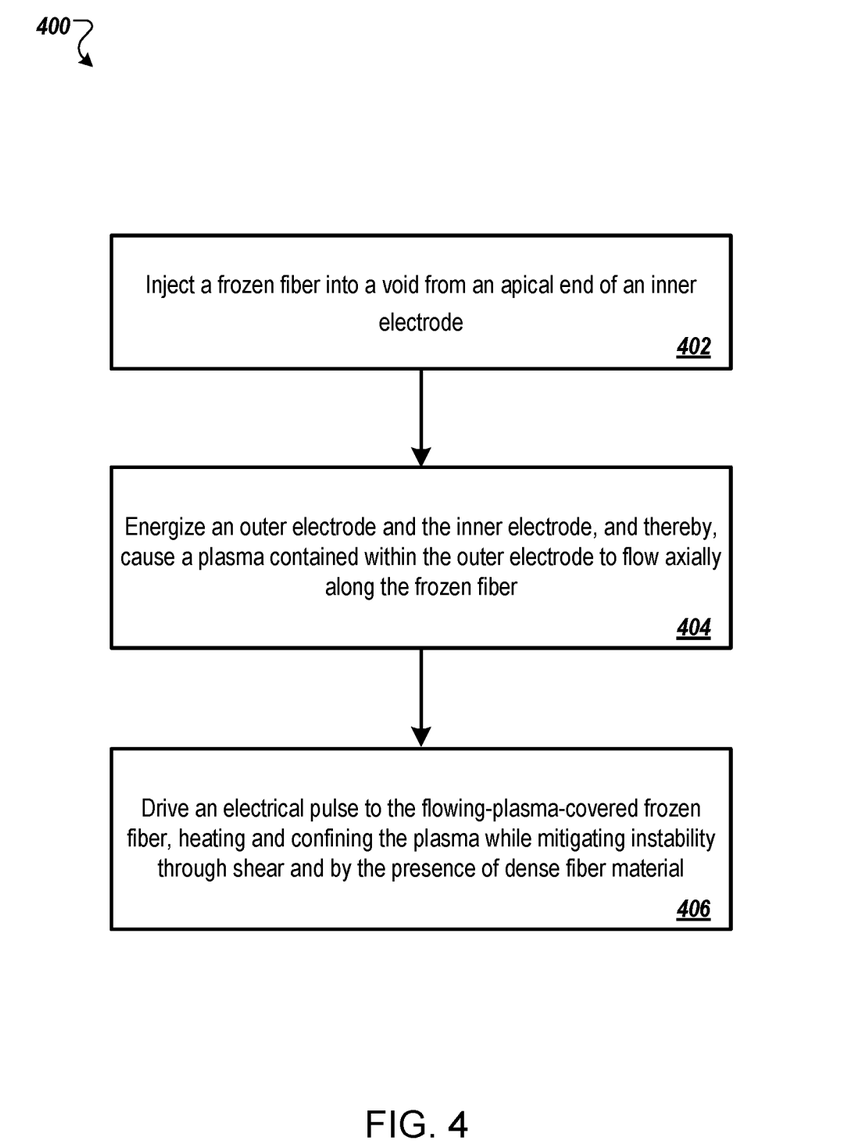
FIG. 4 depicts a flow diagram that illustrates an example process for reducing plasma instability.

FIG. 4 depicts a flow diagram that illustrates an example process 400 for reducing plasma instability. The process includes injecting a frozen fiber from an apical end of an inner electrode (402). The frozen fiber can be, for example, the fiber 120 extruding from the inner electrode 104. The frozen fiber can be a dense fiber composed of, for example, deuterium, tritium, or a combination of deuterium and tritium. The frozen fiber can extrude from the inner electrode into a void within an outer electrode.

The process includes energizing the outer electrode and the inner electrode, and thereby, causing a plasma contained within the outer electrode to flow axially along the frozen fiber (404). The outer electrode and the inner electrode can be energized with an electrode power source, e.g., the power supply 105. The plasma can be composed of deuterium, tritium, helium-3, or any combination of deuterium, tritium, and helium-3. The plasma can flow with a shear, e.g., plasma nearer to the frozen fiber can flow at a different velocity than plasma nearer to the outer electrode.

The process includes driving an electrical pulse to the flowing-plasma-covered frozen fiber, heating and confining the combined plasma while mitigating instability through shear and by the presence of dense fiber material (406). The electrical pulse can be driven by a frozen fiber power source that is the same as the electrode power supply, or that is a separate power source. The presence of material from the frozen fiber can reduce instability in the plasma, enabling the plasma to reach and sustain the large currents needed to reach high temperatures and densities.

The process 400 can repeat at set or variable intervals. In some examples, the process 400 can repeat at intervals of several times per second, once per second, or once per few seconds. Between each interval, the plasma can exit the void through an exhaust port.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for reducing plasma instability, comprising:
energizing a set of magnetic coils to generate a magnetic field in a void within a chamber, an axis of the set of magnetic coils defining an axial direction;

injecting a frozen fiber from a first electrode into the void in the axial direction towards a second electrode positioned in the void energizing the first electrode and the second electrode to generate a plasma liner around the frozen fiber; and driving an electrical pulse to at least one of the first electrode and the second electrode.

2. The method of claim 1, wherein energizing the first electrode and the second electrode generates the plasma liner by sublimation of the frozen fiber.

3. The method of claim 1, wherein:

energizing the first electrode and the second electrode comprises applying a first voltage across the first electrode and the second electrode; and driving the electrical pulse to the at least one of the first electrode and the second electrode comprises applying a second voltage across the first electrode and the second electrode, the second voltage being greater than the first voltage.

4. The method of claim 1, comprising energizing the first electrode and the second electrode when the frozen fiber reaches the second electrode.

5. The method of claim 1, comprising driving the electrical pulse to the at least one of the first electrode and the second electrode when the plasma liner surrounds the frozen fiber.

6. The method of claim 1, wherein the frozen fiber comprises one or more of deuterium and tritium.

7. The method of claim 1, wherein the plasma liner comprises one or more of deuterium, tritium, and helium-3.

8. The method of claim 1, comprising energizing the first electrode and the second electrode using one or more of a microwave energy source or a laser energy source.

9. A system for reducing plasma instability, comprising:

a set of magnetic coils configured to generate a magnetic field in a void within a chamber, an axis of the set of magnetic coils defining an axial direction;

a fiber injector configured to inject a frozen fiber from a first electrode into the void in the axial direction towards a second electrode positioned in the void;

means for energizing the first electrode and the second electrode to generate a plasma liner around the frozen fiber; and means for driving an electrical pulse to at least one of the first electrode and the second electrode.

10. The system of claim 9, wherein energizing the first electrode and the second electrode generates the plasma liner by sublimation of the frozen fiber.

11. The system of claim 9, wherein:

energizing the first electrode and the second electrode comprises applying a first voltage across the first electrode and the second electrode; and driving the electrical pulse to the at least one of the first electrode and the second electrode comprises applying a second voltage across the first electrode and the second electrode, the second voltage being greater than the first voltage.

12. The system of claim 9, wherein driving the electrical pulse to the at least one of the first electrode and the second electrode comprises driving the electrical pulse to the first electrode and the second electrode when the plasma liner surrounds the frozen fiber.

13. The system of claim 9, wherein the frozen fiber comprises one or more of deuterium and tritium.

14. The system of claim 9, wherein the plasma liner comprises one or more of deuterium, tritium, and helium-3.

15. A system for reducing plasma instability, comprising:

a fiber injector configured to inject a frozen fiber from an apical end of an inner electrode, wherein the inner electrode is disposed inside of a void defined within an outer electrode and is arranged coaxial with the outer electrode;

means for energizing the outer electrode and the inner electrode to generate a plasma liner around the frozen fiber; and means for driving an electrical pulse to the frozen fiber.

16. The system of claim 15, wherein:

the outer electrode comprises a first end and a second end opposite from the first end;

an inner electrode comprises a base end defined by the first end of the outer electrode, the apical end being opposite from the base end; and the frozen fiber is injected from the apical end of the inner electrode towards the second end of the outer electrode.

17. The system of claim 15, wherein energizing the outer electrode and the inner electrode generates the plasma liner by sublimation of the frozen fiber.

18. The system of claim 15, further comprising a set of magnetic coils configured to generate a magnetic field in the void.

19. The system of claim 15, wherein driving the electrical pulse to the frozen fiber comprises driving the electrical pulse to the frozen fiber when the plasma liner surrounds the frozen fiber.

20. The system of claim 15, wherein the frozen fiber comprises one or more of deuterium and tritium.

\* \* \* \* \*